United States Patent
Amendolia

[15] 3,648,521
[45] Mar. 14, 1972

[54] LIGHT INDICATOR

[72] Inventor: Pasquale J. Amendolia, c/o T. D. Company P. O. Box 475, St. James, N.Y. 11780

[22] Filed: Oct. 23, 1968

[21] Appl. No.: 770,015

[52] U.S. Cl. ................................................73/293, 73/327
[51] Int. Cl. .........................................................G01f 23/00
[58] Field of Search ..............73/293, 355; 240/2.1; 356/229, 356/230, 231, 232; 340/380

[56] References Cited

UNITED STATES PATENTS

| | | | |
|---|---|---|---|
| 2,567,046 | 9/1951 | Anderson | 340/380 |
| 2,740,957 | 4/1956 | Davies | 340/380 |
| 2,927,502 | 3/1960 | Watrous | 73/355 |
| 3,051,035 | 8/1962 | Root | 73/355 |
| 3,054,291 | 9/1962 | Landwer | 73/293 |

FOREIGN PATENTS OR APPLICATIONS

| | | | |
|---|---|---|---|
| 407,779 | 3/1934 | Great Britain | 73/54 |

OTHER PUBLICATIONS

" Instrumental Methods of Analysis" by Willard Merritt and Dean; copyright August 1965, pages 53 and 54 fourth edition

*Primary Examiner*—Louis R. Prince
*Assistant Examiner*—Denis E. Corr

[57] ABSTRACT

A device for indicating visually relative changes in physical phenomena including an element for transmitting light, a pair of opposed contractingly colored light sources, means for varying the relative intensity and/or condition of the light sources thereby transmitting through the element a color indicative of the change.

7 Claims, 5 Drawing Figures

Patented March 14, 1972
3,648,521
2 Sheets-Sheet 1
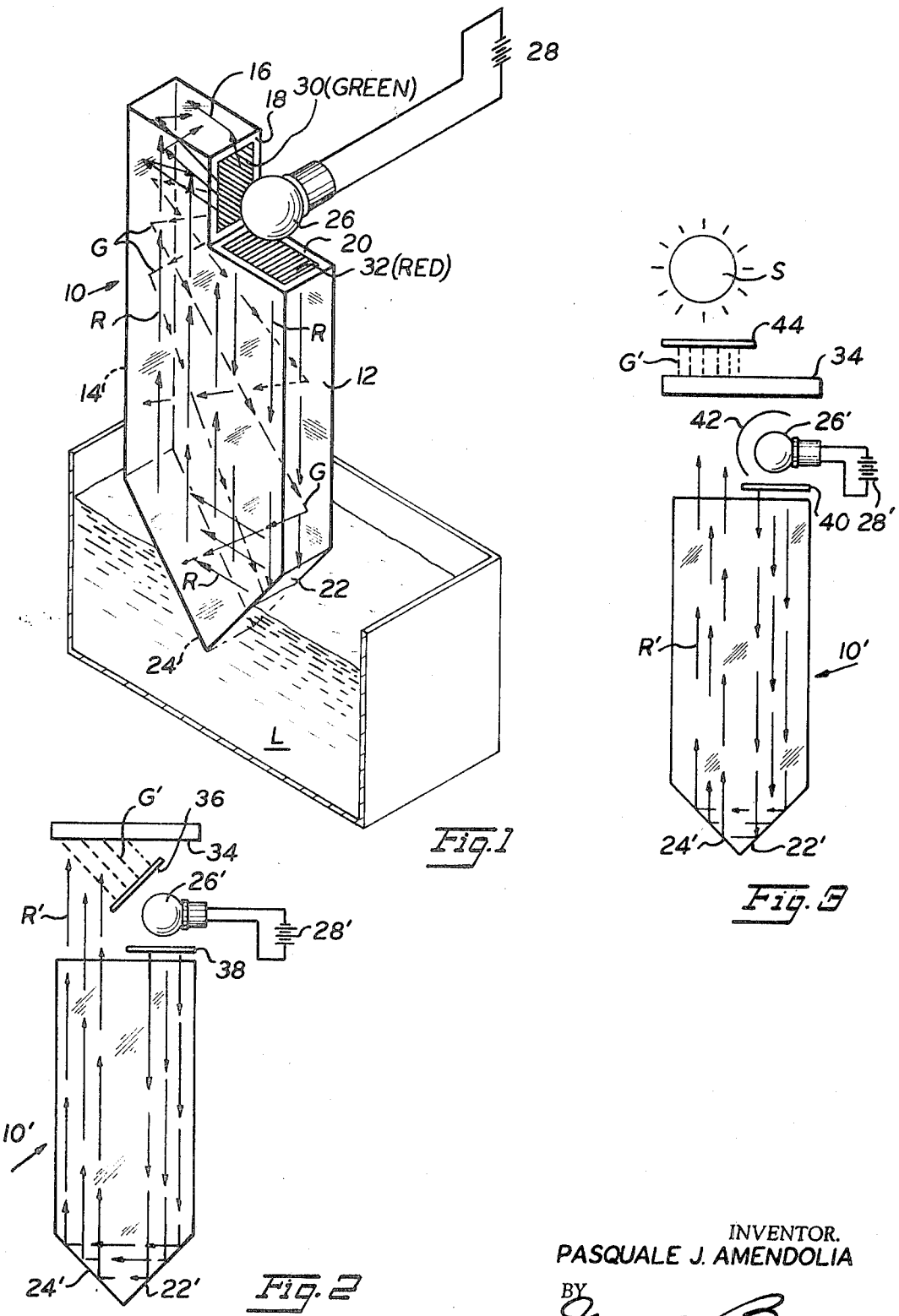
INVENTOR.
PASQUALE J. AMENDOLIA
BY
ATTORNEY Patented March 14, 1972

INVENTOR.
PASQUALE J. AMENDOLIA
BY
ATTORNEY 3,648,521

LIGHT INDICATOR

BRIEF SUMMARY AND OBJECTS OF THE INVENTION

The present invention relates to visual indicating devices and, in particular, to devices for transmitting information responsive to remote variable physical phenomena.

It is well known that glass conducts and transmits light through itself. More recently plastic materials such as "Lucite," a product of the Dupont Corporation, have been synthetized which produce and provide the benefits of glass. When such conductive media is formed into geometrical shapes such as prisms, rods or fiber-oriented wire, light information can be transmitted from one given point to another in seemingly straight lines.

I have discovered that by casting on such shapes, colored light sources from opposed directions, a composite or mixed resultant hue is visible and that by subsequently varying the intensity or amount of one or both of the sources, the resultant hue would be caused to change. Employing this principle, I have developed novel structures and means by which light and color can be made responsive to variable phenomena, electrical stimuli, changes in the physical composition and quantities of materials such as liquids and gases or solids.

As an example of the utility of the present invention, reference is made to the need for indicators for measuring volumetric conditions of such new fluids as space vehicle fuels ("solid" and "liquid") and super-jet airplane fuels both of which are highly volatile, unstable and easily explosive. In the past, fluid level indicators for fuel storage tanks used metallic probes which were inserted within the body of the fuel and through which the electrical characteristics of the fuel could be continuously monitored and translated to volumetric measurement. Such devices are no longer suitable since the slightest electrical discharge, short circuit or accident could easily result in explosive consequences. It has recently been suggested that such highly dangerous fuels could be stored in flexible containers which, under pressure and use, could be made to contract and thereby indicate the volume of fluid therein. These devices are also unsuitable because of their cost and special economics as well as being only approximately reliable as a means of measuring volume. It is an object of this invention to provide an indicator suitable for measuring volumetric conditions of liquids and similar materials.

As another example of the utility of the present invention, reference is made to the need for devices for visually indicating changing physical phenomena such as the temperature of running engines or motors, the change in atmospheric or climatic conditions, or even changes in the operation of electric or electronic circuitry. Numerous sensing devices and transducers have been developed to sense the various enumerated changes, however the need exists for translating such sensed stimuli into visual indications. In operations where speed and accuracy are essential, visual indicators, particularly color coded, have been found to be most satisfactory. It is therefore also an object of this invention to provide a visual indicator responsive to changes in physical stimuli.

It is another objective of this invention to provide an indicating device having a visual display capable of being responsive to a variety of changing phenomena.

It is an object of this invention to provide an indicating device employing constasting light sources, responsive to variable physical phenomena to create a resultant color hue indicative of such change.

It is a specific object of this invention to provide a device for indicating the condition of liquid levels.

It is another specific object to provide a visual indicator responsive to the sensing or transducing of physical phenomena into electrical stimuli.

Other and many objectives, uses and advantages of the present invention will be apparent from the following description in which reference is made to the accompanying drawings in which:

DESCRIPTION OF THE DRAWINGS

FIG. 1 is a schematic representation of an indicator made in accordance with the present invention, FIG. 2 is a schematic representation of a second version of the indicator shown in FIG. 1, FIG. 3 is a schematic representation of a third version of the indicator shown in FIG. 1.

DETAILED DESCRIPTION

Figure 4:
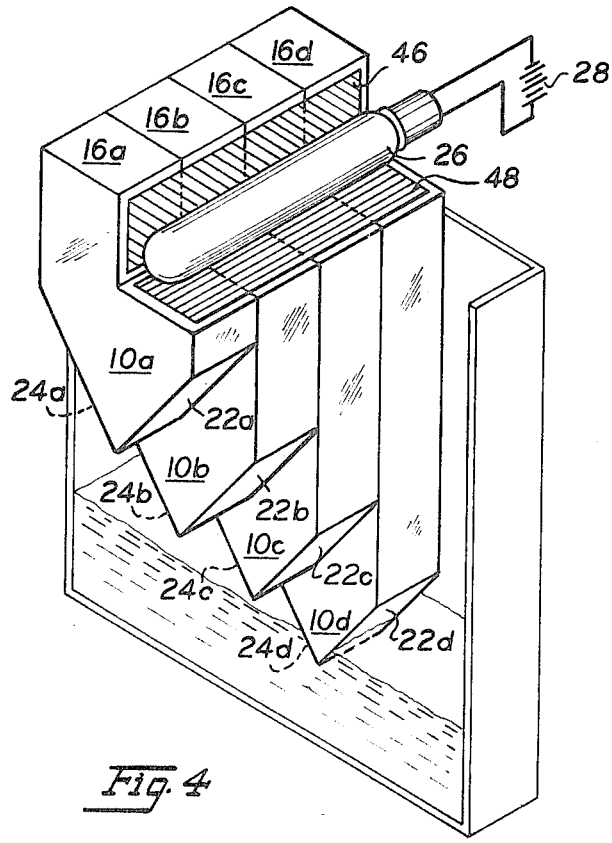
FIG. 4 is a schematic view of a liquid level indicator employing a plurality of devices shown in FIG. 1.

Briefly, the present invention is directed to providing a device employing a pair of discrete light sources impinging upon and penetrating a light conductive medium at angles to each other. Because the medium is light conductive, the two sources of light penetrate the medium, intermix and may be viewed at a remote point. If the two sources are of different colors, the hue at the remote viewing point will be the addition of the rays emanating from the two sources. By varying the intensity and/or color of any one of the sources as a function of some outside physical phenomena, the hue can be made to change its additive color indicating the change in physical phenomena itself. When one light source is held constant, it acts as a reference against which the varying light source is compared. The resultant appearance of the light source at the viewing point makes it seem that the constant light source either diminishes or increases in intensity while, in fact, it remains constant, the varying light source either overpowering or being overpowered by the constant source.

Carrying this concept into practice, there has been developed various structural embodiments satisfying and obtaining the objectives set forth.

FIG. 1 shows a form of the present invention which may be employed as a sensing device for determining liquid level within a storage tank. Such a device is adaptable primarily with the aforementioned highly explosive fuels. It eliminates all of the dangers and disadvantages inherent in the older systems for such uses. However, it will be recognized that the device may be employed in many other situations.

Turning to FIG. 1, the device basically comprises an elongated substantially rectangular glass or plastic element generally identified by the numeral 10 having substantially straight side walls 12 and 14. The length of the element is not critical since the transmission of light through highly conductive glass and plastic of the type heretofore described and which is to be preferred is not materially effected by length. The upper end of the element 10 is stepped and is provided with an outer viewing face 16, a vertical wall 18 and a shoulder 20. The shoulder 20 and wall 18 are shown as being normal to each other. They do not need to be perpendicular in all environments; however, they should in practice be, at least, angular to each other. The lower end of element 10 is also provided with a pair of angularly disposed surfaces 22 and 24, the exact disposition of which must present a prismatic surface respectively with respect to the shoulder 20 and the upper viewing surface 16.

Located between the vertical wall 18 and the shoulder 20 is a source of white light, such as a bulb 26 suitably connected to a source of power, such as a battery 28. Between the bulb 26 and the wall 18 is a light filter 30 of suitable color and between the bulb 26 and the shoulder 20 is a light filter 32 of a contrasting color. The colors of filters 30 and 32 are not critical but must be sufficiently contrasting to be individually effective but nevertheless complimentary to intermix into a resultant hue. The colors green and red fit these requirements and for the purpose of this description can be suitably used for the filters 30 and 32, respectively.

It will be observed that by following the natural laws of light transmission, the light from bulb 26 will fall on both the green and red filters 30 and 32 on substantially equal intensity and pass into the element 10.

The green light rays depicted by broken arrows G tend to diffuse throughout the element 10 in heterogenous fashion since they will initially intersect the element angularly to its longitudinal axis. On the other hand, the red light rays, depicted by arrows R, intersecting the element 10 along lines substantially parallel to the longitudinal axis, tend to follow straight paths downwardly toward the prismatic surface 22 where they will be reflected along angles substantially normal to the axis of the element 10, thence reflect again on surface 24 to follow a straight line path upward to the face 16.

The reflection of light from the lower end of the element 10 is of course a result of their incidence with the angularly disposed surfaces and the reflective quality of these surfaces. Normally when exposed to ambient light conditions, the cut prism surfaces 22 and 24 cut and polished at an angle of not greater than 42.2°, are highly reflective and will act to bend substantially all the light rays incident thereon. Thus, while the observed hue on face 16 will be a mixture of the rays from filter 30 which are diffused throughout the element 10 and of the rays from filter 32 reflected from the prisms' surfaces, its color will be predominantly that from the filter 32 since the reflected rays, being more direct and undiffused, overpower the rays from filter 30.

On the other hand, the prism surfaces are easily susceptible and adaptable to being made opaque, absorbtive of light or even conductive of light by such expedients as blocking the external ambient light or by providing an external filter or by use of other absorbing media. As a result, all or part of the rays from filter 32 may be made to pass out of the element 10, and to the extent that light from the source is permitted to pass through the prism surfaces then, to that extent, the resultant hue on face 16 is derived of the benefit of its color. Consequently, by such expedients, the resultant hue on face 16 may be made to pass from dominant red when the prism surfaces 22 and 24 are permitted to be highly reflective to a dominant green when the prism surfaces are made virtually opaque.

According to the present invention, opaqueness is accomplished as a function of and by utilizing that media which is to be measured, i.e., the liquid of which the level is to be determined. Thus, returning to FIG. 1, it will be observed that as the element 10 is lowered within a liquid L, the prism surfaces 22 and 24 become covered and the rays incident thereon at this point, for example those rays R' of the total rays are not reflected and are either absorbed or passed through the liquid. It will be appreciated that, with the given colors, for example, if and when the lower end of element 10 is fully immersed within the liquid, the color to be observed on face 16 will be predominantly green (the rays from filter 30) since substantially all of the red rays from filter 32 will be absorbed within the liquid.

As the liquid is used or gradually recedes from contact with the prism surfaces 22 and 24 and the surfaces become more exposed, red rays from filter 32, incident upon the free portions of surfaces 22 and 24 will reflect onto the face 16 mixing with the green, turning the hue to orange. As the liquid completely empties and moves out of contact with surfaces 22 and 24, the hue observed on the face will change from predominantly green to predominantly red. Thus, the present device provides a most suitable indicator of liquid volume. A green light observed on face 16 indicates a full volume of fluid while a red light indicates the absence of fluid and any mixture of light between the two extremes indicates a similar condition between volumetric extremes.

It can now be clearly seen that the present invention provides a device which may safely be employed as a volumetric indicator for highly explosive fuels. The device employs material (glass or plastic) which is nonconductive of electrical charges and so avoids the risks found in the prior art. Further, the material can be chosen so as to minimize chemical reaction and thus retard corrosion and/or contamination of the fuel making it long-lived. Additionally, the light source is remote of and not integral with the probe like element and, therefore, whatever electrical connection is made is thoroughly insulated from the fuel. Further still, the device is void of moving parts and thus can be made rugged and durable for use in space vehicles.

In the foregoing description and in the Figures appended hereto, omission is made of various constructional details such as the means for mounting bulbs or filters. The means for shielding the two color sources from undersired interference with each other and for shielding the light source from dissipation have also been omitted. Not shown as well are means for mounting the device within the liquid tank. All of these details are well known and easily obtained and their description here is believed unnecessary.

The device may also be employed to determine atmospheric conditions or gaseous states since such phenomena will or can be made to determine the opacity of prism surfaces in the same manner as a liquid. Numerous other uses will be readily apparent to the reader. Furthermore, the present device is susceptible to simple modification. The element 10, here shown as being rectangular, can be rodlike oval or any other configuration to fit the purpose intended.

The choice of light source may be conveniently selected from the classes of sources available including the white or colored light bulbs, fluorescent lamps, neon lights, etc. and the choice of color for the filters may likewise be chosen from a large class of contrasting colors.

In principle, the phenomena of the device shown in FIG. 1 employs the mixing of contrasting light sources (red rays R and green rays G) upon a visible surface, varying one of the light sources responsive to a change in outside stimuli whereby the resultant hue of the mixed light assumes a corresponding change.

Accordingly, various versions of the structure employing this principle are available. One such version is shown in FIG. 2 wherein an element 10' substantially similar to the element 10 of FIG. 1 is seen. Element 10' is again elongated and is provided with prism surfaces 22' and 24'; however, it is provided with a remote viewing . 34 rather than an integral viewing face as in the element 10 of FIG. 1. The bulb or light source 26' is mounted above the upper edge of the element 10' and is made to cast its light through filters 36 and 38 which are suitably shielded, one from the other. One of the filters 36, is positioned so as to cast its color directly on the remote viewing screen 34 as indicated by the dotted arrows G' while the other filter 38 transmits its color through the element 10' as indicated by arrows R' Consequently, the rays R' are reflected as described heretofore on the viewing screen 34. This version of the inventive device operates in exactly the same manner as that shown in FIG. 1 with the same result, except that the viewing face is capable of being remotely positioned from the element 10.

Another version is shown in FIG. 3 wherein use is made of ambient light as a source contrasting with a variable artificial light source. In this modification, a device substantially similar to that shown in FIG. 2 is constructed. However, here the artificial light source 26' is provided with only one filter 40 and is shielded by an opaque cover 42 from casting light directly on to the viewing surface. The upper surface of this viewing screen 34 is permitted to be open to an ambient light source such as the sun S and is provided with a filter 44 to convert the sunlight into desired color rays. By such a device, the artificial light source is contrasted with a color intensity derived from the ambient source, but otherwise operating in exactly the same manner as the device of FIG. 2.

This latter device (FIG. 3) not only may be employed as a fluid level indicator but may be employed per se solely as a light level indicator contrasting merely filtered artificial with unfiltered ambient light. In this case, either artificial or ambient light might be considered the reference and the prism surfaces are maintained at a uniform and fixed level of opaqueness so that the two sources are directly contrasted.

A specific version of the present invention which renders the present invention more employable as a liquid level measuring and indicating device is shown in FIG. 4 wherein a plurality of elements, as shown in FIG. 1, are combined into a set. Four such elements 10a to 10d are shown, although an infinite number may be so combined. Each element is exactly the same and functions in the same manner as described previously in connection with FIG. 1. For convenience, single enlarged filters 46 and 48 may replace each of the individual filters 30 and 32, respectively. The elements 10a to 10d differ from each other in only one respect, namely, their length, and are serially elongated so that they progress from small to large in substantially equal increments. If if is to be assumed that the device of FIG. 4 is to be employed as a level indicator for liquid stored in a tank, the four units shown may be progressively sized so as to indicate the level of liquid from full to empty in quarter tank increments. The shortest element 10a will of course indicate the highest level of liquid while the longest element 10d will indicate the lowest level.

When inserted in a tank of liquid, the indicator will have each of its surfaces 16a–16d indicate a greenish (assuming filter 46 is green) hue as described before since all of the prism surfaces will be rendered opaque by contact with the liquid. As the liquid empties, each of the faces 16a to 16d change from green to red (assuming filter 48 to be red) as the liquid recedes from contact with the surfaces 22 and 24. As the liquid recedes some elements will be completely devoid of contact while the prism surfaces of another of the elements will only partially be devoid of contact. That element which is only partially immersed in the liquid will cast a hue or mixture of green and red as described in connection with FIG. 1, indicating as well, the level in partial increments between elements or quarter tank positions. Since the viewing face is a composite of the individual faces of each of the elements 10a to 10d, the color observed in a partially empty tank appears to progress from red to green in incremental stages corresponding to the number of elements.

This multielement version of the invention is, of course, more accurate than the single element version and consequently is to be preferred where accuracy and reliability are required.

Figure 5:
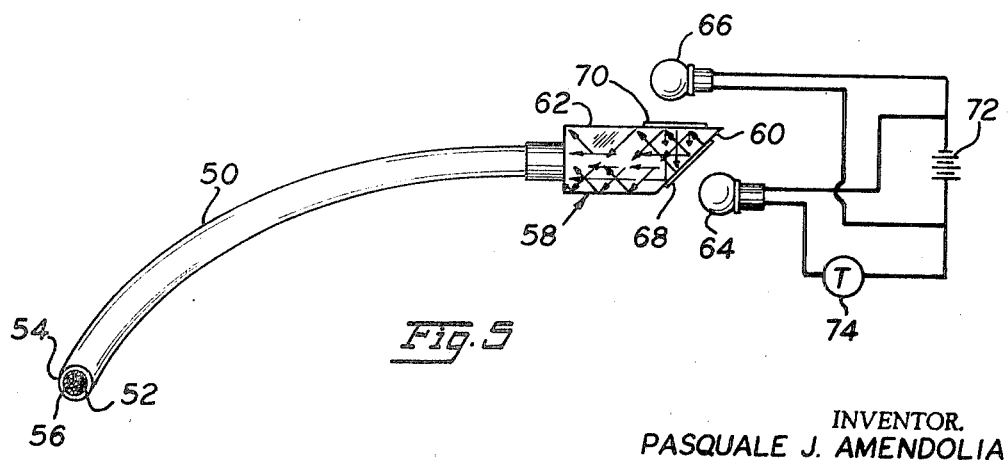
FIG. 5 is a schematic representation of visual indicator responsive to variable electrical stimuli derived from changable physical phenomena.

FIG. 5 shows the present invention applied to the construction of an indicator responsive to changes in electrical stimuli as may be received from various sources such as operational circuitry, heat transducers and light transducers.

The device shown in FIG. 5 comprises an elongated light transmitting element 50 which is here shown as a bundle of fiber oriented plastic "wire" 52 of the type marketed by the Dupont Corporation under the trade name "CROFON." The use of a "wire" is made to illustrate the versatility of the present invention. It is most times, if not in all instances, the equivalent of the element shown in FIG. 1. A rod or other geometric shape is equally adaptable.

The "wire" bundle is wrapped in an opaque shield 54 that aids in preventing escape of reflected light and insuring straight line transmission from end to end. The forward end 56 being free of the shielding material conveniently forms the view face. At the rear end is mounted a prism element 58 having a pair of angularly disposed faces 60 and 62. Located externally of each face is a light source such as a bulb 64 and 66, respectively.

Between each bulb and its respective face is located a filter 68 and 70. The filters 68 and 70 are of contrasting colors and in the manner of the version of FIGS. 1–4 may conveniently be green and red respectively.

Each of the light sources are independently connected to a source of power 72. It is preferred that one of the bulbs be connected to the source so as to supply it with a constant and uniform current and/or voltage thereby producing a uniform base of reference of constant intensity. The other bulb is connected to its source of power through the variable stimuli producing sensing device such as heat transducer 74, so that its light intensity will be directly responsive to the changing phenomena it is designed to indicate. The transducer 74 is, of course, connected to the media or changing physical phenomena in the well known manner. In practice, the constant reference color would preferably be green and the variable color red since changes in red, even of a small degree, are more easily visible.

In operation, the device shown in FIG. 5 functions like that of FIGS. 1–4. The two light sources cast rays of the contrasting color onto the prism fitting 58 which then transmits the color rays directly to the viewing face. The resultant color of source depends upon the intensity of the two light sources and to the extent the light source casting the red rays is made to vary by operation of the transducer than to that extent the color can be made to vary from red to green.

The device shown in FIG. 1 may be adapted to indicate the heat or temperature of a running engine or motor coupled to the transducer or to any other changing physical phenomena capable of being translated into an electrical stimulus. As with the devices shown in the preceding Figures, the device shown in FIG. 5 is capable of being modified. A rod or elongated element, such as shown in FIG. 1, may be substituted for the wire bundle and/or a remote viewing screen may be provided. Furthermore, FIG. 5 indicates the adaptability and convertibility of the various versions of the device so that the resultant function of FIG. 5 may be obtained by the use of the structure of FIG. 1 and vice-versa without any major change.

Accordingly, it will be seen that the present invention provides an indicating device satisfying all of the objectives enumerated in the introduction hereto.

What is claimed is:

1. A fluid level indicator comprising a light conductive element having a lower end adapted to be inserted within said fluid, said lower end being internally provided with a reflective surface, the transmission quality of which is modified on contact with said fluid, said element having an upper end provided with means for viewing reflected light transmitted therethrough and a pair of contrastingly colored light sources, said light sources being mounted to transmit their light rays angularly with respect to each other to said viewing means whereon they are combined into a resultant hue, one of said light sources being so mounted to transmit its rays via said reflective surface whereby the resultant hue on said viewing means becomes a function of the depth of insertion of said lower end into contact with said fluid, said lower end of said conductive element is formed into a prism having a pair of surfaces angularly disposed so as to be in light incidence with at least one light source and said viewing surface respectively, said upper end of said conductive element is provided with a flat viewing surface, a vertical wall and shoulder angularly disposed to said wall, a single light mounted between said vertical wall and said shoulder, and contrastingly colored light filter positioned between said light and said vertical wall and shoulder respectively, so as to provide said two light sources.

2. Apparatus for indicating the depth of a fluid comprising an elongated light conductive member provided at one end with a prism for reflecting light axially therethrough and at the other end with a surface for viewing light transmitted therethrough, a first colored light source mounted adjacent said other end of said member to cast light rays axially of said member, a second colored light source mounted adjacent said other end of said member to cast light rays angular to said first colored light rays, said rays being combined on said viewing surface as a hue which is the resultant of said colors, means for inserting said member into said fluid rendering at least a portion thereof unreflective of light and said resultant hue is correspondingly modified thereby indicating the depth of said liquid.

3. The apparatus according to claim 2, comprising a plurality of said members ranging in size between predetermined lengths, said members being serially joined with their viewing surfaces contiguous and in a common phase, whereby said plurality of members, upon insertion within the fluid, is made to indicate incremental levels thereof corresponding to the length of the respective elements.

4. Apparatus for visually indicating changes in physical stimuli comprising an elongated light conductive element, means at one end of said element for viewing reflected light transmitting therethrough, a prism at the other end of said element, said prism having a pair of surfaces, one surface adapted to transmit light into said element axially thereof, said other surface adapted to transmit light into said element angularly thereto, a colored light source located adjacent each of said prism surfaces and means for varying the intensity of at least one of said light sources responsive to said changing physical stimuli and thereby vary the resultant combination of colors transmitted through said element.

5. The apparatus according to claim 4, wherein said light sources are of contrasting colors whereby said resultant color may change from one to another as a result of said stimuli.

6. The apparatus according to claim 5, including means for maintaining one light source constant whereby the intensity of said variable light source is contrasted therewith.

7. The apparatus according to claim 4, wherein said elongated element is a flexible wire of oriented conductive material.

* * * * *